United States Patent
Exner et al.

(10) Patent No.: US 11,153,710 B2
(45) Date of Patent: Oct. 19, 2021

(54) METHOD FOR DETERMINING A GEOFENCE PARAMETER OF A GEOFENCE AREA RELATED TO A POINT OF INTEREST AND RELATED ELECTRONIC DEVICE

(71) Applicant: Sony Mobile Communications Inc., Tokyo (JP)

(72) Inventors: Peter Exner, Malmö (SE); Magnus Johansson, Lund (SE)

(73) Assignee: Sony Network Communications Europe B.V., Hoofddorp (NL)

( * ) Notice: Subject to any disclaimer, the term of this patent is extended or adjusted under 35 U.S.C. 154(b) by 0 days.

(21) Appl. No.: 16/686,131

(22) Filed: Nov. 16, 2019

(65) Prior Publication Data
US 2020/0204945 A1    Jun. 25, 2020

(30) Foreign Application Priority Data

Dec. 20, 2018 (SE) .................................. 1851619-5

(51) Int. Cl.
H04W 4/021 (2018.01)
(52) U.S. Cl.
CPC .................................. H04W 4/021 (2013.01)
(58) Field of Classification Search
CPC .............................. H04W 4/021; H04W 4/022
See application file for complete search history.

(56) References Cited

U.S. PATENT DOCUMENTS

| | | |
|---|---|---|
| 9,706,355 B1 | 7/2017 | Cali et al. |
| 2015/0148060 A1 | 5/2015 | Parab et al. |
| 2015/0223023 A1 * | 8/2015 | Das .................. H04M 1/72522 455/457 |
| 2015/0230053 A1 | 8/2015 | Scellato et al. |
| 2015/0230054 A1 | 8/2015 | Myllymaki et al. |
| 2015/0341747 A1 * | 11/2015 | Barrand ................ H04W 4/022 455/405 |

(Continued)

FOREIGN PATENT DOCUMENTS

| WO | 2011057273 A1 | 5/2011 |
|---|---|---|
| WO | 2016201021 A1 | 12/2016 |

OTHER PUBLICATIONS

Search Report and Office Action from corresponding Swedish Application No. 1851619-5, dated Jul. 25, 2019, 8 pages.
EESR dated Apr. 15, 2020; Appl. No. EP19208848; 7 pgs.

*Primary Examiner* — Marisol Figueroa
(74) *Attorney, Agent, or Firm* — Tucker Ellis LLP (57) ABSTRACT

The present disclosure provides a method, performed at an electronic device, for determining a geofence parameter of a geofence area related to a point of interest, POI. The method comprises obtaining a location of the POI, obtaining first POI data based on the location of the POI. The method may comprise determining, based on the location of the POI, one or more entities in proximity of the POI. The method comprises obtaining second POI data related to at least one entity of the one or more entities. The method comprises generating a set of enclosing features related to the POI based on the second POI data, wherein generating the set of enclosing features comprises applying a processing scheme to the second POI data; and determining a geofence parameter based on the first POI data and the set of enclosing features.

19 Claims, 6 Drawing Sheets

(56) References Cited

U.S. PATENT DOCUMENTS

| | | | |
|---|---|---|---|
| 2016/0036516 A1* | 2/2016 | Ling | H04H 20/08 455/7 |
| 2016/0063516 A1* | 3/2016 | Terrazas | G06K 9/6267 705/7.29 |
| 2016/0225072 A1* | 8/2016 | Brady | G06Q 40/02 |
| 2020/0166230 A1* | 5/2020 | Ng | F24F 11/62 |

* cited by examiner

Fig. 4

METHOD FOR DETERMINING A GEOFENCE PARAMETER OF A GEOFENCE AREA RELATED TO A POINT OF INTEREST AND RELATED ELECTRONIC DEVICE

RELATED APPLICATION DATA

This application claims the benefit of Swedish Patent Application No. 1851619-5, filed Dec. 20, 2018, the disclosure of which is incorporated herein by reference in its entirety.

TECHNICAL FIELD

The present disclosure relates to geofencing. In particular, the present disclosure relates method for determining a geofence parameter of a geofence area related to a point of interest and related to an electronic device.

BACKGROUND

In many tracking applications, detecting the arrival to or departure from a point of interest, POI, is done by defining a virtual barrier called a geofence.

Arrival and departure events can then be detected when a tracking unit registers that an element is located inside an area defined by the geofence or outside the area defined by the geofence, respectively.

As geofence areas are not so precisely defined, a tracking unit may register that an element has arrived by detecting that the element is within the geofence area, while actually the element may just be travelling by on a nearby road included in the geofence area.

This may be seen as resulting in many false positive arrival and departure events being registered and thereby polluting the tracking application.

There is a need for improving geofencing techniques.

SUMMARY

Accordingly, there is a need for devices and methods, which addresses the challenges presented and provides a geofence solution, which detects e.g. the arrival, rest stops and departure of elements with an improved accuracy in order to provide more robust geofencing techniques.

The present disclosure provides a method, performed at an electronic device, for determining a geofence parameter of a geofence area related to a point of interest, POI. The method comprises obtaining a location of the POI, obtaining first POI data based on the location of the POI. The method may comprise determining, based on the location of the POI, one or more entities in proximity with the POI. The method comprises obtaining second POI data related to at least one entity of the one or more entities. The method comprises generating a set of enclosing features related to the POI based on the second POI data, wherein generating the set of enclosing features comprises applying a processing scheme to the second POI data; and determining a geofence parameter based on the first POI data and the set of enclosing features.

Further, an electronic device is provided, the electronic device comprising: an interface, a memory module, and a processor module. The electronic device is configured to perform any of the methods disclosed herein.

Further, a system is provided, the system comprising: an electronic device disclosed herein, and a client device. The system is configured to perform any of the methods disclosed herein.

Further, the present disclosure provides a computer readable storage medium storing one or more programs, the one or more programs comprising instructions, which when executed by an electronic device with an interface, a memory module, and a processor module cause the electronic device to perform any of the methods disclosed herein.

It is an advantage of the present disclosure that a geofence parameter is determined accurately in that the geofence of a POI correctly takes into account enclosing features such as buildings, parking lots, industrial areas, etc. And the disclosed methods allow to exclude surfaces and elements (such as other POI and/or nearby roads) which should not be included in a geofence area, which would otherwise result in false positive events of arrival and departures.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which are essential to the understanding of the invention, while other details have been left out. Throughout, the same reference numerals are used for identical or corresponding parts.

Figure 1:
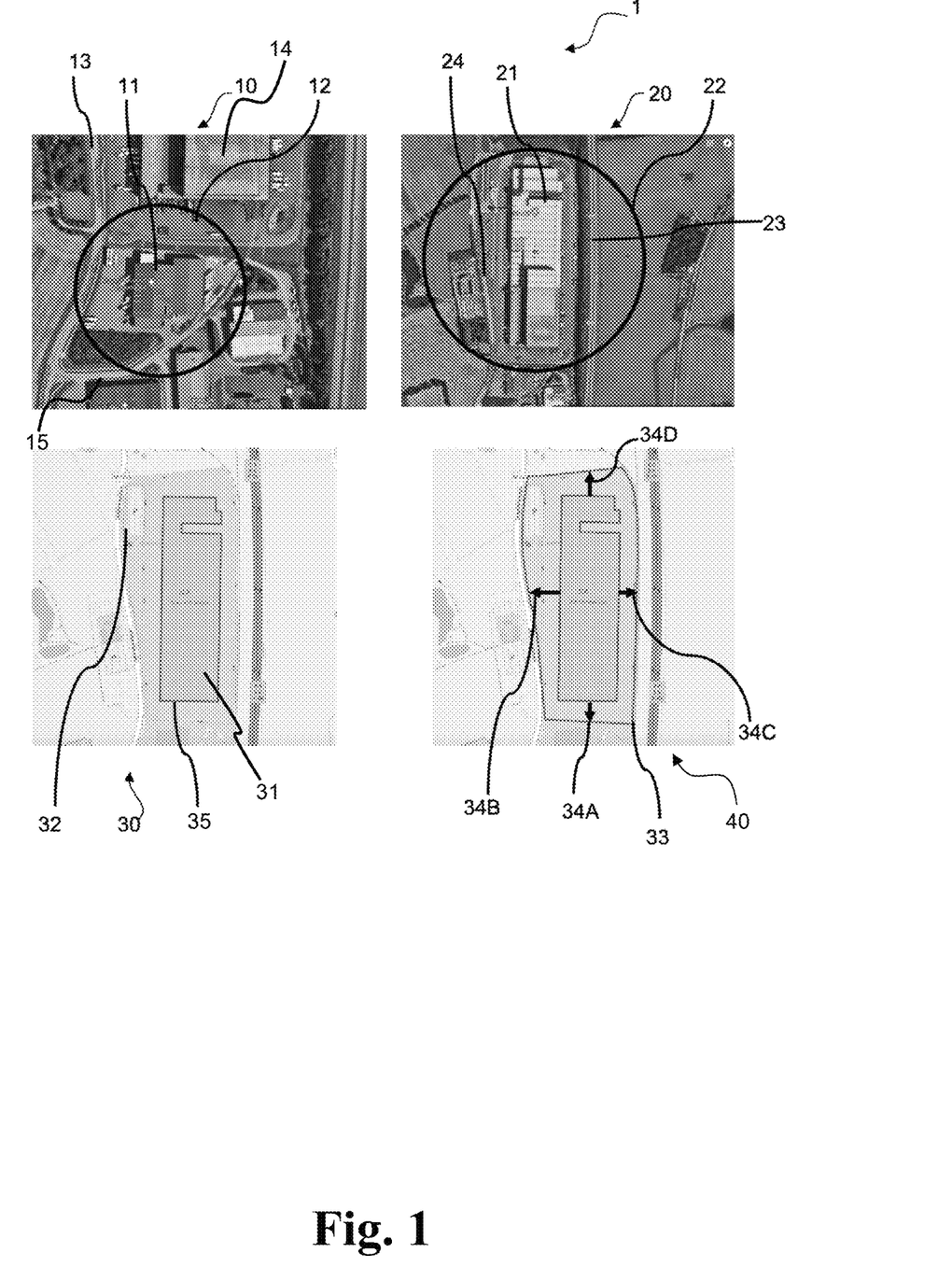
FIG. 1 is an illustration of exemplary point of interests.

An approach to geofence is to determine a circle with a fixed radius around a POI wherein the POI latitude and longitude is used as the center of the circle. Image 10 shows a geofence defined by use of a fixed radius covering a POI.

A similar approach is to use a predetermined shape to define the geofence.

These approaches present disadvantages. A disadvantage may be that a too small fixed radius may exclude parts of the POI needed for detecting arrival/departure, while a too large radius may include other POIs thereby triggering false positives detections. Conversely, a too large radius may result in capturing other POIs and trigger false detections of arrival or departure. Another disadvantage may be that using predetermined shapes is also limited in that boundaries around a POI, such as buildings, can form all types of shapes which may be exhaustive to define in a predetermined manner and which is not sufficient for changes in POI features in times (e.g. buildings etc.).

Another possible approach relates to performing hand annotations through a user interface. A disadvantage of manually drawing a geofence is that it is resource intensive and does not scale for automatic applications. In addition, it requires curation as the objects may undergo changes, e.g. the parking lot of a cargo terminal or the terminal itself may be expanded over time.

Another possible approach relates to including context., e.g. multiple tracking patterns connected by context, e.g. multiple routes with the same named endpoint. However, semantics, such as different namings of an establishment, make connecting different patterns through context difficult. In addition, such approach based on context has shortcomings in that sufficient amounts of patterns are necessary to be amassed in order to cover the POI completely. Such an approach based on context creates noise and is thereby not accurate.

Thus, there is a need for a solution with an improved accuracy in order to provide accurate geofencing, and possible logistics information relying on the geofencing. Detection events are critical for both logistics departments in large companies as well as for freight forwarding companies.

FIG. 1 is an illustration 1 of exemplary point of interests (POI) in exemplary images. FIG. 1 shows in the top left an exemplary image 10. Image 10 shows a POI 11 in the form of a warehouse, where e.g. trucks deliver and pick-up goods, a first road 13, second POI 14, and a second road 15.

Image 10 applies an approach for forming a geofence base on a fixed radius from the POI 11 which results in forming a geofence area 12, which is circular. As is seen in image 10, the disadvantage of forming a geofence using this approach, surrounding roads 13 or other further POIs, e.g. PO 14, may also be included in determining the geofence. For example, trucks are likely to be tracked as both entering and leaving the geofence area 12 when passing by the POI 11, e.g. when passing by on the road 13, before possibly entering the geofence area 12. This may result in an arrival event indicating an earlier time of arrival, which may be incorrect.

Image 20 shows a POI 21 in the form of a warehouse, where e.g. trucks deliver and pick-up goods, a first road 23, and a second road 24.

Image 20 applies an approach for forming a geofence base on a fixed radius from the POI 21 which results in forming a geofence area 22, which is circular. As is seen in image 20, the disadvantage of forming a geofence using this approach, surrounding roads 23 and 24 may also be included in determining the geofence. For example, trucks are likely to be tracked as both entering and leaving the geofence area 22 when passing by on the second road 23 even when the truck does not end up entering the geofence area 22. This may result in an arrival event indicating a time of arrival, which is incorrect, because in this example, the truck does not stop on the parking lot of the POI 21.

Thus, there is a need for a solution with an improved accuracy in order to provide accurate geofencing information.

The present disclosure proposes to obtain first POI data indicative of e.g. geometric feature, e.g. a shape, of the POI (such a shape of a building of the POI).

Image 30 shows a POI 31 and illustrates a shape 35 of a building of the POI 31 and a parking lot 32. The first POI data may comprise data indicative of shape 35 and data indicative parking lot 32 (e.g. its location and shape).

Image 40 shows an indicator 33, a first feature 34A, a second feature 34B, a third feature 34C, and a fourth feature 34D. The present disclosure proposes to generate a set of enclosing features which may support in defining enclosure(s), e.g. indicated by indicator 33, and any of features 34A, 34B, 34C, 34D. For example, the set of enclosing features may comprise one or more enclosing features that assist in delimiting the indicator 33 and in identifying features such as one or more of the first feature 34A, the second feature 34B, the third feature 34C, and the fourth feature 34D.

Figure 2:
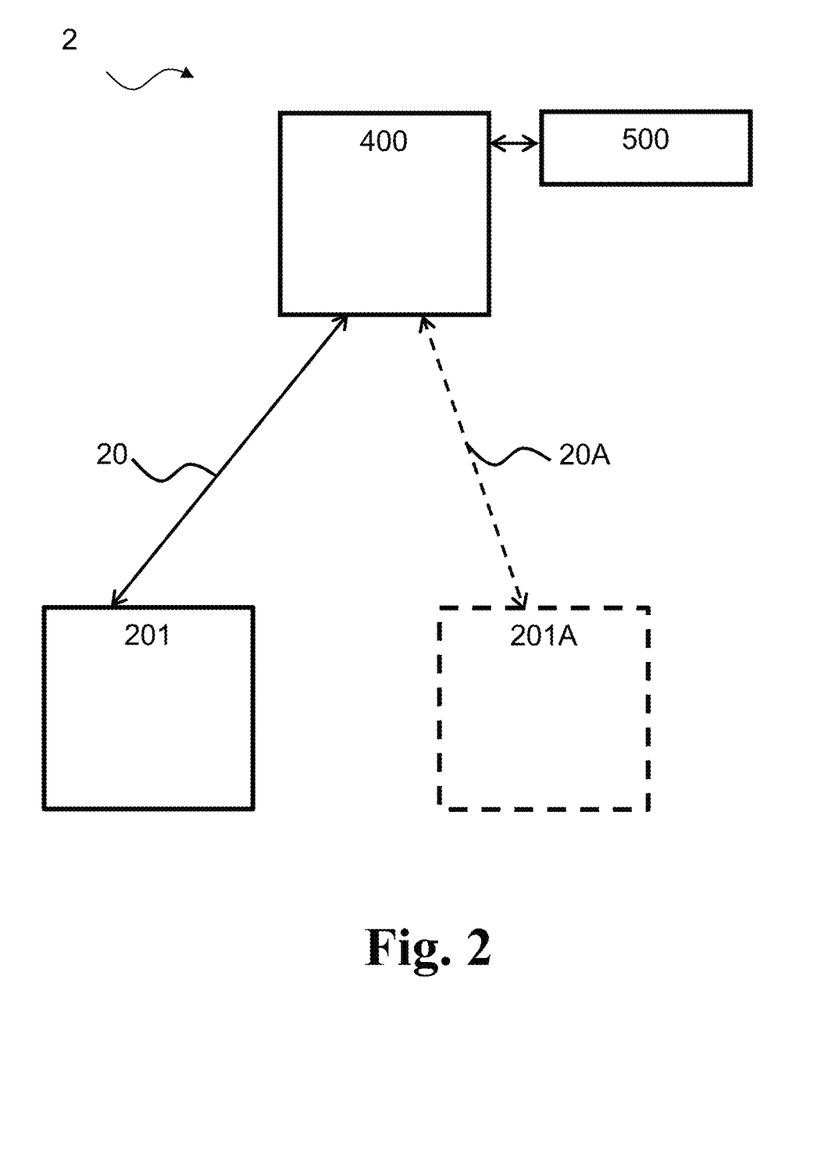
FIG. 2 is a diagram illustrating an exemplary system comprising an exemplary electronic device and an exemplary client device according to this disclosure.

FIG. 2 is a diagram illustrating an exemplary system 2 comprising an exemplary electronic device 400 and a first exemplary client device 201 and a Geographical Information System, GIS database 500. A Geographical Information System, GIS, is a system, which is designed to capture, store, manipulate, analyze, manage, and present spatial or geographic data. GIS data, e.g. from a GIS database (e.g. GIS database 500), is used to create initial geofences that surround a Point of Interest, POI. Example of GIS databases may comprise OpenStreetMap.

System 2 may comprise a second exemplary client device 201A according to this disclosure.

As discussed in detail herein, the present disclosure relates to an electronic device 400 configured to communicate with GIS database 50 to obtain e.g. first POI data disclosed herein.

For example, the electronic device 400 may be a server device, e.g. a cloud-based server device.

The electronic device 400 is configured to communicate with the first client device 201 (and optionally with the second client device 201A) via wireless links 20 (and optionally link 20A) to enable the first client device 201 to indicate a time of arrival or departure based on a geofence parameter determined as disclosed herein and provided to the first client device 201 by the electronic device 400 optionally acting as a server device.

A client device disclosed herein may comprise a portable electronic device (e.g. a mobile phone, a smart phone, a tablet) and/or a client device embedded in a vehicle which is adapted to deliver goods.

The present disclosure provides a client device comprising a memory module, an interface and a processor module, wherein the client device is configured to obtain, e.g. received and/retrieve, a geofence parameter from the electronic device.

Further, a system is provided, the system comprising: an electronic device disclosed herein, and a client device. The system is configured to perform any of the methods disclosed herein (e.g. method 300 of FIG. 3A-3C).

Figure 3A:
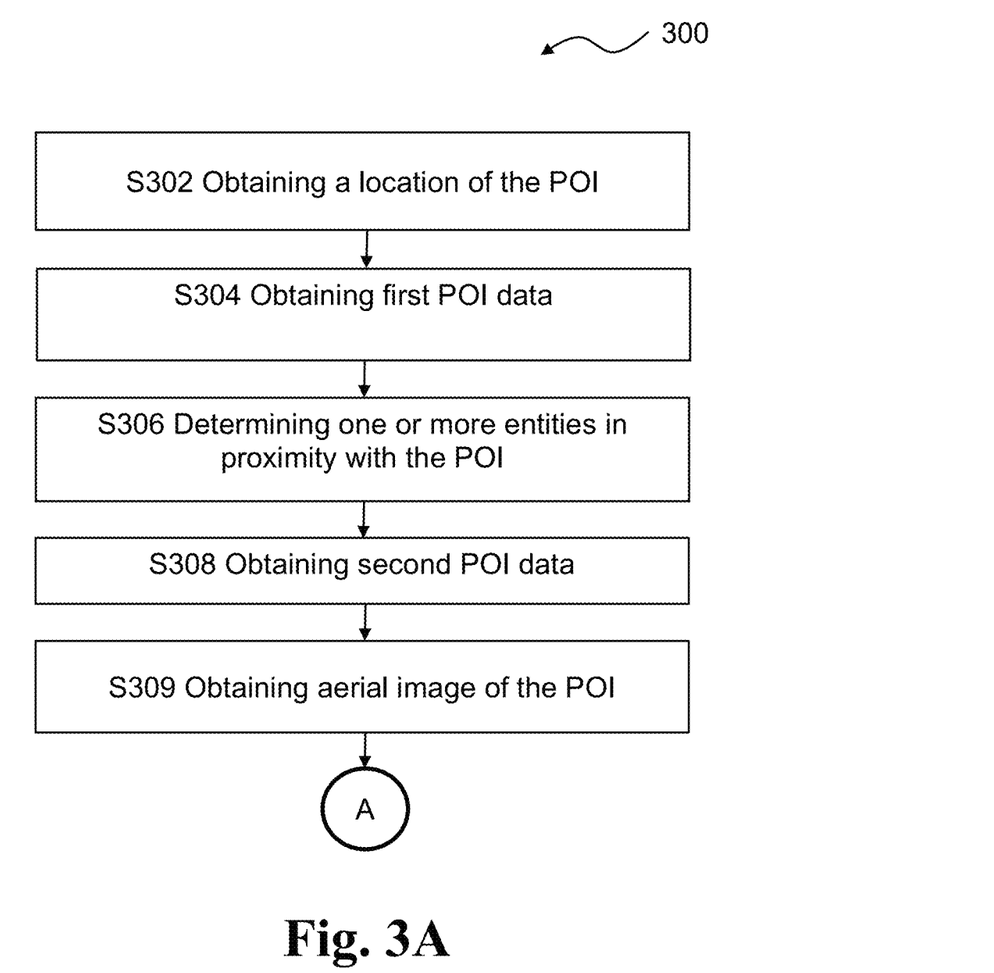
FIGS. 3A-3C are flow-charts illustrating exemplary methods, performed in an electronic device, for determining a geofence parameter of a geofence area related to a point of interest according to this disclosure.
Figure 3B:
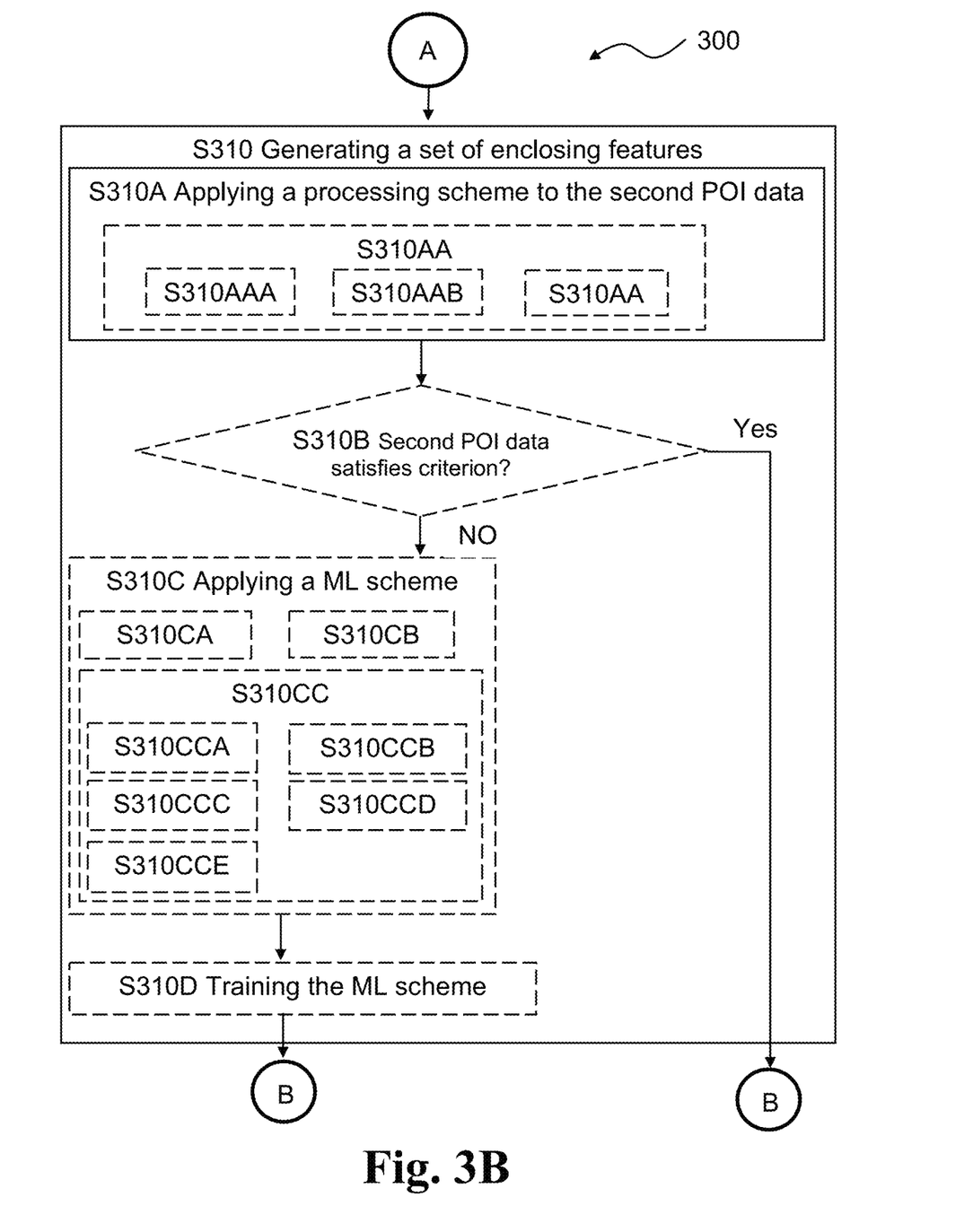
Figure 3C:
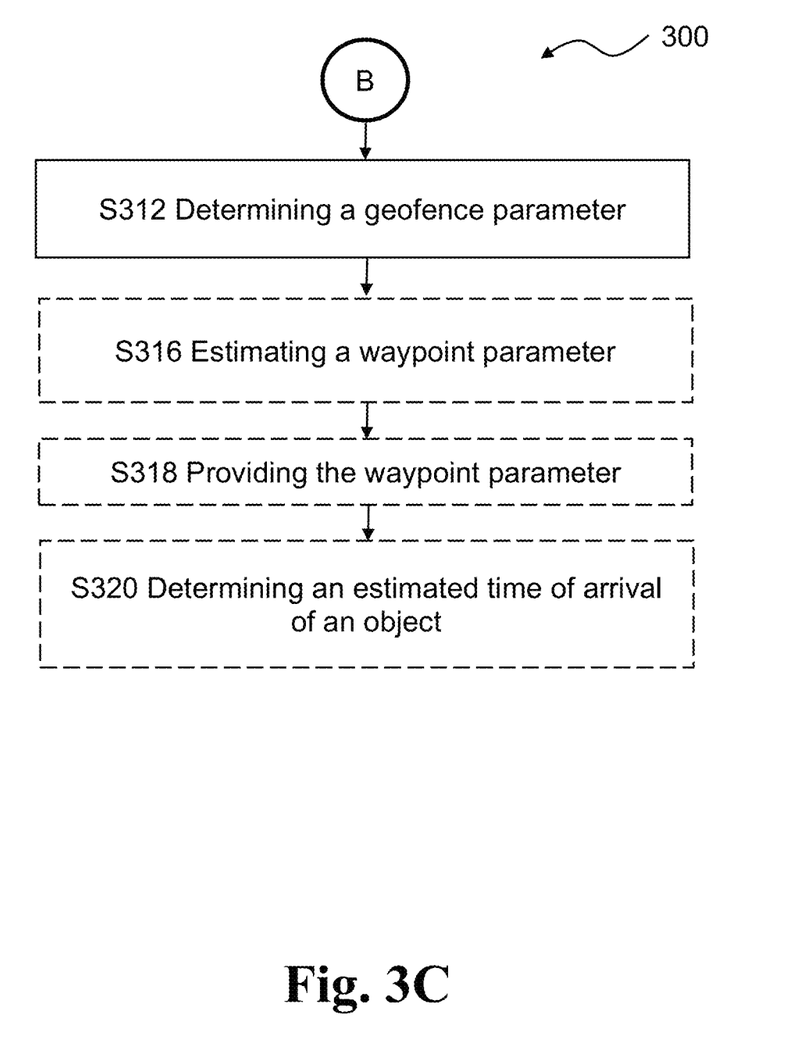
Figure 4:
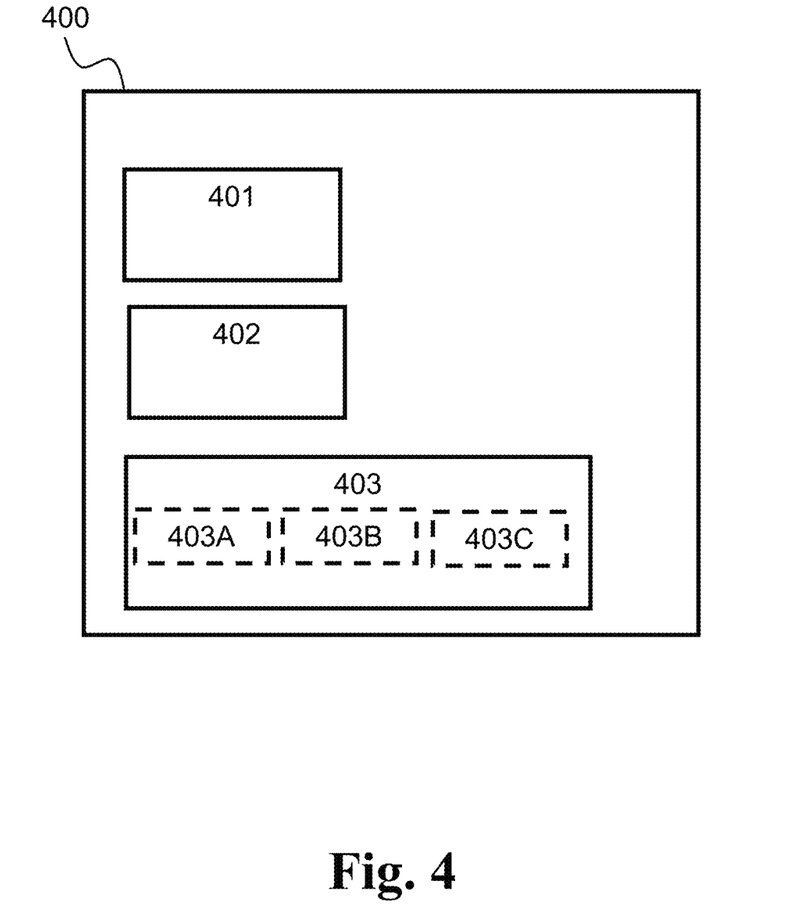
FIG. 4 is a block diagram illustrating an exemplary electronic device according to this disclosure.

FIGS. 3A-3C are flow-charts illustrating exemplary methods 300, performed in an electronic device (e.g. the electronic device disclosed herein, e.g. electronic device 400 shown in FIGS. 2 and 4). The method 300 is performed for determining a geofence parameter of a geofence area related to a point of interest, POI, according to this disclosure.

The method 300 comprises obtaining S302 a location of the POI (e.g. a geographic location of the POI). Obtaining S302 the location of the POI may be via a user interface, or via geographic database.

For example, a location may comprise an initial latitude and/or an initial longitude corresponding to a geographic position of the POI.

The method 300 comprises obtaining S304 first POI data based on the location of the POI. The first POI data may comprise a first set of features of the POI. Obtaining S304 the first POI data may comprise obtaining (e.g. retrieving) the first POI data from a geographic information database, such as a GIS database.

For example, first POI data may comprise GIS data, e.g. from a GIS database.

A first set of features of the POI may refer to features of the POI, such as building information from a GIS database, based on initial latitude and longitude. In other words, for example, obtaining S304 first POI data may comprise extracting a POI structure, e.g. building information from a GIS database (e.g. OpenStreetMap), based on the location of the POI (e.g. the initial latitude and longitude).

The method 300 comprises determining S306, based on the location of the POI, one or more entities in proximity of the POI.

In one or more exemplary methods, determining S306 one or more entities in proximity of the POI may be based on the location of the POI and optionally on the first set of features.

In one or more exemplary methods, determining S306, based on the location of the POI, one or more entities in proximity of the POI comprises determining one or more entities within a given range from the location of POI.

In one or more exemplary methods, determining S306, based on the location of the POI, one or more entities in proximity of the POI comprises determining one or more entities being arranged adjacent to the location of POI. Stated differently, the one or more entities may be seen as one or more nearby entities.

One or more entities may refer to the nearest features surrounding the POI structure. In other words, the one or more entities may be parking lots, industrial areas, service roads and other features. The one or more entities comprise a primary entity, and optionally a secondary entity, and optionally a tertiary entity.

The method 300 comprises obtaining S308 second POI data related to at least one entity of the one or more entities. The second POI data may comprise a second set of features associated with to the at least one entity.

For example, the second set of features may comprise a set of geometric features associated with an entity of the one or more entities (e.g. a primary entity of the one or more entities). Geometric features may comprise shapes, e.g. polygons.

When the one or more entities comprise a primary entity and a secondary entity, the second POI data may comprise a second primary set of features associated with to the primary entity, and a second secondary set of features associated with the secondary entity. For each additional entity, an additional set of geometric features associated with the additional entity may be obtained and included in the second POI data.

The method 300 comprises generating S310 a set of enclosing features related to the POI based on the second POI data. Generating S310 the set of enclosing features may comprise applying S310A a processing scheme to the second POI data. In other words, generating S310 the set of enclosing features may comprise generating the set of enclosing feature associated with the POI.

For example, the set of enclosing features may refer to spatial features surrounding or enclosing the POI. Spatial features surrounding or enclosing the POI may be parking lots, industrial areas, service roads and other features adjacent to the POI.

The method 300 comprises determining S312 a geofence parameter based on the first POI data and the set of enclosing features. In one or more exemplary methods, enclosing features may comprise spatial features surrounding or enclosing the POI. In one or more exemplary methods, the geofence parameter comprises a perimeter of a geofence area, a shape of a geofence area, and/or a layout of a geofence area. A geofence parameter may refer to one or more spatial boundaries or limits of the geofence area.

Further, determining the geofence parameter according to this disclosure may lead to a more accurate geofence determination in that the number of POIs (or POI types) may be increased compared to what is provided today by location services (e.g. Google places, MapBox, etc.). Thereby, warehouse management systems may exploit the present disclosure for enhancing their use of geofencing.

In one or more exemplary methods, applying S310A the processing scheme to the second POI data comprises applying S310AA an iterative scheme to the second POI data (e.g. based on the one or more entities determined in S306). In other words, the processing scheme may be an iterative scheme.

In one or more exemplary methods, applying S310AA an iterative scheme to the second POI data may comprise iterating on obtaining one or more further sets of features associated with further entities additional to the at least one entity (e.g. additional to e.g. the primary entity (e.g. the secondary entity, and/or the tertiary entity and/or Nth entity where N is an integer).

In one or more exemplary methods, applying S310AA the iterative processing scheme to the second POI data comprises iteratively performing S310AAA for each entity of the one or more determined entities: obtaining S310AAB a further set of features of (e.g. associated with) the entity, and generating S310AAC the set of enclosing features based on the second POI data comprising the further set of features. In other words, generating S310AAC the set of enclosing features based on the second POI data comprising the further set of features and the second set of features. The further set of features may be seen as associated with the corresponding entity of the one or more entities. For example, for each entity in addition to the at least one entity of the one or more determined entities, applying S310AA the iterative processing scheme to the second POI data comprises iteratively performing S310AAA. For example, when the one or more determined entities comprises the primary entity, the secondary entity, a tertiary entity, applying S310AA the iterative processing scheme to the second POI data comprises iteratively performing S310AAA by:

For the secondary entity:
 obtaining S310AAB a second secondary set of features of (e.g. associated with) the secondary entity, and generating S310AAC the set of enclosing features based on the second POI data comprising the second secondary set of features; and For the tertiary entity:
 obtaining S310AAB a second tertiary set of features of (e.g. associated with) the tertiary entity, and generating S310AAC the set of enclosing features based on the second POI data comprising the second tertiary set of features.

In this example, the second POI data comprises the second primary set of features, the second secondary set of features, the second tertiary set of features.

The method 300 may comprise excluding a further set when the further set is determined to be associated with another POI (e.g. excluding shapes that enclose other entities (e.g. other warehouses) or to correspond to a type such as residential area, village boundary, etc. (e.g. connecting roads which are the only exit points for vehicles).

In one or more exemplary methods, the method 300 comprises obtaining S309 an aerial image of the POI based on the location of the POI. Obtaining S309 the aerial image of the POI may comprise obtaining (e.g. retrieving) the aerial image from an aerial imaging database or system. An aerial image may be a satellite image, and/or an image taken by a drone.

In one or more exemplary methods, generating S310 the set of enclosing features comprises determining S310B whether the second POI data satisfies a criterion. The criterion may relate to a sufficiency criterion, such as whether the POI is enclosed by polygons corresponding to the set of enclosing features. The criterion is not satisfied e.g. when the POI is not sufficiently (e.g. completely) enclosed by polygons corresponding to the set of enclosing features. For example, the criterion may be based on determining whether all features (e.g. polygon) of the first POI data share vertices with at least two other features (e.g. polygons) of the second POI data.

For example, the criterion may be based on determining whether geofence parameter generated from the set of enclosing features, e.g. by extracting the convex hull from the union of all features(polygons), encloses the POI.

For example, if iterating through the nearby entities does not result in enclosing the POI (e.g. the premise or building of the POI), the second POI data (e.g. GIS data) is determined as not satisfying the criterion (e.g. the second POI data is determined as insufficient).

In one or more exemplary steps, the method 300 comprises, when it is determined S310B that the second POI data does not satisfy the criterion, applying S310C a machine-learning scheme based on the obtained aerial image.

In one or more exemplary methods, applying S310C the machine-learning processing scheme based on the obtained aerial image may comprise applying S310CA a neural network model to perform inference on the obtained aerial image (e.g. to predict the set of enclosing features and/or geofence parameter). The machine-learning processing scheme may be trained based on previously determined sets of enclosing features which has satisfied the criterion and generated geofence parameters for other POIs. Inference may for example be performed using statistical inference, and/or probabilistic inference. Training may comprise training a binary classifier for segmentation, e.g. a neural network, to identify an enclosing area of buildings.

In one or more exemplary methods, applying S310C the machine-learning processing scheme based on the obtained aerial image may comprise generating S310CB a mask representing an enclosing area of the POI. For example, an enclosing area of the POI may include parking lots, service roads, sheds, and other annexes surrounding the POI. The mask may comprise a binary mask (e.g. white and/or black), which may support identifying enclosures in an unambiguous manner.

Stated differently, the disclosed method uses a GIS database to create initial geofences that surrounds a Point of Interest POI. The initial geofence is paired with a corresponding aerial image to train a machine-learning model. In the cases when no GIS information is available for a POI, the machine-learning processing scheme enables extracting a set of enclosing features for geofence from an aerial image. The disclosed methods allow extracting an initial data from a GIS database, and training a machine-learning processing scheme and generating geofence parameters from the output of the machine-learning processing scheme.

For example, a criterion may be to have sufficient second POI data to define an enclosure of the POI with the set of enclosing features. When the obtained POI data satisfies a criterion, proceed to determining the geofence parameter. For example, if generating the set of enclosing features provides a set of shapes that enclose the POI, then a perimeter defined by the set of enclosing features (e.g. the outside perimeter of the set of shapes) provide the geofence parameter of the geofence area. The method 300 may comprise storing the geofence parameter and a corresponding aerial image and use the set of enclosing features, the geofence parameter and corresponding aerial image of the POI to train a machine-learning model underlying the machine-learning processing scheme.

For example, in S310, generating training data by transforming an aerial image into a binary mask is carried out by using the enclosing area built in a lookup phase as the geofence parameter.

In one or more exemplary methods, applying S310C the machine-learning processing scheme based on the obtained aerial image may comprise generating S310CC the set of enclosing features based on the mask.

Performing inference may refer to predicting the set of enclosing features. For example, predicting the set of enclosing features may refer to carrying out probabilistic models.

In one or more exemplary methods, generating S310CC the set of enclosing features based on the mask may comprise applying S310CCA a component labelling scheme to the mask to assign image features to a component label for each component of the obtained aerial image.

In one or more exemplary methods, applying S310CCA a component labelling scheme to the mask may comprise applying a connected component labelling to the binary mask to identify which pixels belong together.

In one or more exemplary methods, generating S310CC the set of enclosing features based on the mask may comprise selecting S310CCB a component corresponding to the location of the POI.

In one or more exemplary methods, generating S310CC the set of enclosing features based on the mask may comprise generating S310CCC a set of geometric features for each component.

For example, generating S310CCC a set of geometrical features may comprise defining an initial geofence by generating a set of polygons surrounding all pixels in the component, e.g. by using Moore-Neighbor tracing algorithm. Optionally, a line-simplification algorithm, e.g. Visvalingam-Whyatt or Ramer-Douglas-Peucker, may be applied to simplify the polygon.

In one or more exemplary methods, generating S310CC the set of enclosing features based on the mask may comprise applying S310CCD for each component a mapping function from a set of image coordinates corresponding to the set of geometric features to a set of geospatial coordinates.

For example, applying S310CCD for each component a mapping function from a set of image coordinates corresponding to the set of geometric features to a set of geospatial coordinates may comprise translating pixel coordinates to geospatial coordinates using a mapping function based on image boundaries to coordinates during lookup from aerial image system.

In one or more exemplary methods, generating S310CC the set of enclosing features based on the mask may comprise generating S310CCE the set of enclosing features.

For example, the steps S310CCA-S310CCE may be carried out applying a boundary extraction algorithm that extracts a set of enclosing features based on a segmented aerial image (and/or the disclosed mask).

In one or more exemplary methods, the method 300 comprises training S310D the machine-learning processing scheme based on training data. In one or more exemplary methods, training data may be obtained by transforming the obtained aerial image into a mask and training a binary classifier for segmentation, e.g. a neural network, to identify the enclosed area (e.g. of buildings). In one or more exemplary methods, training the machine-learning processing scheme may comprise storing the geofence parameter with a corresponding aerial image.

In one or more exemplary methods, the method 300 comprises estimating S316 a waypoint parameter based on the geofence parameter and optionally providing S318 the waypoint parameter.

In one or more exemplary methods, a waypoint parameter may comprise a longitude and/or a latitude (e.g. Universal Transverse Mercator UTM). A waypoint parameter may be used for navigation.

In one or more exemplary steps, the method comprises determining S320 an estimated time of arrival of an object based on the geofence parameter.

For example, an object may be a vessel, goods, etc.

FIG. 4 shows a block diagram of an exemplary electronic device 400 according to the disclosure.

As discussed in detail herein, the present disclosure relates to an electronic device 400 comprising an interface 401, a memory module 402, and a processor module 403.

The electronic device 400 is configured to obtain, e.g. via the processor module 403 (e.g. via an obtainer module 403A) a location of the POI. The electronic device 400 is configured to obtain, e.g. via the processor module 403 (e.g. via an obtainer module 403A) first POI data based on the location of the POI. The first POI data optionally comprises a first set of features of the POI. The electronic device 400 may be configured to determine, e.g. via the processor module 403 (e.g. via a determiner module 403B), based on the location of the POI, one or more entities in proximity of the POI. The electronic device 400 is configured to obtain, e.g. via the processor module 403 (e.g. via the obtainer module 403A) second POI data related to at least one entity of the one or more entities. The second POI data optionally comprises a second set of features associated with the at least one entity (e.g. a primary entity). The electronic device 400 is configured to generate, e.g. via the processor module 403 (e.g. via the generator module 403C) a set of enclosing features related to the POI based on the second POI data, by applying a processing scheme to the second POI data. The electronic device 400 may be configured to determine, e.g. via the processor module 403 (e.g. via the determiner module 403B) a geofence parameter based on the first POI data and the set of enclosing features.

The present disclosure relates to an electronic device 4 comprising an interface 401, a memory module 402, and a processor module 403. The electronic device 4 may be configured to perform any of the methods disclosed herein. The electronic device 400 may be configured to perform any of the methods disclosed in FIGS. 3A-3C.

The electronic device 400 may be configured to communicate with a client device. The interface 401 may be configured for wireless communications via a wireless communication system, such as a 3GPP system.

The processor module 403 is optionally configured to perform any of the operations disclosed in FIG. 3A-3C. The operations of the electronic device 400 may be embodied in the form of executable logic routines (e.g., lines of code, software programs, etc.) that are stored on a non-transitory computer readable medium (e.g., the memory module 402) and are executed by the processor module 403).

Also, while the described functions and operations may be implemented in software, such functionality may as well be carried out via dedicated hardware or firmware, or some combination of hardware, firmware and/or software.

The memory module 402 may be one or more of a buffer, a flash memory, a hard drive, a removable media, a volatile memory, a non-volatile memory, a random access memory (RAM), or other suitable device. In a typical arrangement, the memory module 402 may include a non-volatile memory for long term data storage and a volatile memory that functions as system memory for the processor module 403. The memory module 402 may exchange data with the processor module 403 over a data bus. Control lines and an address bus between the memory module 402 and the processor module 403 also may be present (not shown in FIG. 4). The memory module 402 is considered a non-transitory computer readable medium.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-4 comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications, and equivalents.

The invention claimed is:

1. A method, performed at an electronic device, for determining a geofence parameter of a geofence area related to a point of interest (POI) the method comprising:
    obtaining a location of the POI;
    obtaining first POI data based on the location of the POI, wherein the first POI data is indicative of a geometric feature of the POI;
    determining, based on the location of the POI, one or more entities in proximity of the POI;
    obtaining second POI data related to at least one of the one or more entities;
    generating a set of enclosing features related to the POI based on the second POI data; wherein generating the set of enclosing features comprises applying a processing scheme to the second POI data and determining whether the second POI data satisfies a criterion; and
    determining a geofence parameter based on the first POI data and the set of enclosing features, wherein the geofence parameter indicates a geofence area including the POI and the set of enclosing features,
    wherein applying the processing scheme to the second POI data comprises applying an iterative scheme to the second POI data, and
    wherein applying the iterative processing scheme to the second POI data comprises iteratively performing for each entity of the one or more determined entities:
        obtaining a further set of features of the entity; and
        generating the set of enclosing features based on the second POI data comprising the further set of features.

2. The method according to claim 1, the method further comprising:
    obtaining an aerial image of the POI based on the location of the POI.

3. The method according to claim 2, the method comprising:
    when it is determined that the second POI data does not satisfy the criterion: applying a machine-learning processing scheme based on the obtained aerial image.

4. The method according to claim 3, wherein applying the machine-learning processing scheme based on the obtained aerial image comprises:
    applying a neural network model to perform inference on the obtained aerial image;
    generating a mask representing an enclosing area of the POI; and
    generating the set of enclosing features based on the mask.

5. The method according to claim 4, wherein generating the set of enclosing features based on the mask comprises:
    applying a component labelling scheme to the mask to assign image features to a component label for each component of the obtained aerial image;
    selecting a component corresponding to the location of the POI;
    generating a set of geometric features for each component;
    applying for each component a mapping function from a set of image coordinates corresponding to the set of geometric features to a set of geospatial coordinates; and
    generating the set of enclosing features.

6. The method according to claim 1, the method comprising estimating a waypoint parameter based on the geofence parameter.

7. The method according to claim 1, the method comprising determining an estimated time of arrival of an object based on the geofence parameter.

8. The method according to claim 1, wherein the geofence parameter comprises a perimeter of a geofence area, a shape of a geofence area, and/or a layout of a geofence area.

9. The method according to claim 4, the method comprising training the machine-learning processing scheme based on training data.

10. The method according to claim 1, wherein obtaining the location of the POI comprises obtaining the location of the POI via a user interface, or via geographic database.

11. The method according to claim 1, wherein the location comprises an initial latitude and/or an initial longitude corresponding to a geographic position of the POI.

12. The method according to claim 1, wherein determining, based on the location of the POI, one or more entities in proximity of the POI comprises determining one or more entities within a given range from the location of POI.

13. The method according to claim 1, wherein determining, based on the location of the POI, one or more entities in proximity of the POI comprises determining one or more entities being arranged adjacent to the location of POI.

14. The method according to claim 1, wherein the set of enclosing features comprises spatial features surrounding or enclosing the POI.

15. The method according to claim 1, the method comprising excluding a further set when the further set is determined to be associated with another POI.

16. An electronic device comprising an interface, a memory module, and a processor module, wherein the electronic device is configured to perform the method of claim 1.

17. A non-transitory computer readable storage medium storing one or more programs, the one or more programs comprising instructions, which when executed by an electronic device comprising an interface, a memory module, and a processor module cause the electronic device to perform the method of claim 1.

18. A system comprising:
an electronic device according to claim 16;
a client device; and
a Geographical Information System (GIS) database.

19. A method, performed at an electronic device, for determining a geofence parameter of a geofence area related to a point of interest (POI) the method comprising:
- obtaining a location of the POI;
- obtaining first POI data based on the location of the POI, wherein the first POI data is indicative of a geometric feature of the POI;
- determining, based on the location of the POI, one or more entities in proximity of the POI;
- obtaining second POI data related to at least one of the one or more entities;
- obtaining an aerial image of the POI based on the location of the POI;
- generating a set of enclosing features related to the POI based on the second POI data; wherein generating the set of enclosing features comprises applying a processing scheme to the second POI data and determining whether the second POI data satisfies a criterion, and when determined that the second POI data does not satisfy the criterion, applying a machine-learning processing scheme based on the obtained aerial image; and
- determining a geofence parameter based on the first POI data and the set of enclosing features, wherein the geofence parameter indicates a geofence area including the POI and the set of enclosing features.

* * * * *